US007769818B2

(12) United States Patent
Yoshihara et al.

(10) Patent No.: US 7,769,818 B2
(45) Date of Patent: Aug. 3, 2010

(54) ELECTRONIC DATA MANAGEMENT SYSTEM, ELECTRONIC DATA MANAGEMENT APPARATUS, AND ELECTRONIC DATA MANAGEMENT METHOD

(75) Inventors: Kunio Yoshihara, Hachioji (JP); Yoichi Takaragi, Yokohama (JP); Tsutomu Murayama, Yokohama (JP); Junichi Takano, Sagamihara (JP); Shinichi Fukada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 261 days.

(21) Appl. No.: 11/852,246

(22) Filed: Sep. 7, 2007

(65) Prior Publication Data

US 2008/0071923 A1 Mar. 20, 2008

(30) Foreign Application Priority Data

Sep. 19, 2006 (JP) ............................ 2006-253206

(51) Int. Cl.
*G06F 15/167* (2006.01)
*G06F 15/16* (2006.01)

(52) U.S. Cl. ...................................... 709/213; 709/246

(58) Field of Classification Search ................. 709/213, 709/216–219, 246
See application file for complete search history.

(56) References Cited

U.S. PATENT DOCUMENTS 6,460,163 B1 * 10/2002 Bowman et al. ............ 714/819
6,606,643 B1 * 8/2003 Emens et al. ............... 709/203
6,658,403 B1 * 12/2003 Kuroda et al. .................. 707/2
7,143,445 B1 * 11/2006 Ishiguro et al. ............... 726/31
7,260,612 B2 * 8/2007 Inagaki ....................... 709/213
7,263,497 B1 * 8/2007 Wiser et al. .................... 705/26
7,305,484 B2 * 12/2007 Munetsugu et al. ......... 709/231
2004/0006626 A1 * 1/2004 Inagaki ....................... 709/227
2005/0114450 A1 5/2005 DeVos
2007/0263259 A1 11/2007 Yoshimura

FOREIGN PATENT DOCUMENTS

JP 2000-285024 A 10/2000
WO 2005/046149 A1 5/2005
WO 2006/043495 A1 4/2006

OTHER PUBLICATIONS

Statement in accordance with the Notice from the Eurpean Patent Office dated Oct. 1, 2007 concerning business methods (OJ Nov. 2007; p. 592-593); XP002456252.
Extended search report issued in corresponding European patent application No. 07116728.2-1238, dated Jan. 14, 2008.
Notification of First Office Action issued in corresponding Chinese Patent Application No. 200710153404.4 dated May 15, 2009.

* cited by examiner

*Primary Examiner*—Hussein A. Elchanti
(74) *Attorney, Agent, or Firm*—Rossi, Kimms & McDowell LLP

(57) ABSTRACT

An electronic data management system capable of preventing confusion due to transfer of electronic data, even if electronic data attached with original attribute is transferred is provided. This system includes a transfer source server and a transfer destination server connected via a network. The transfer source server retains electronic data having attribute information attached indicating that the electronic data is the original. The transfer source server duplicates the electronic data to create new electronic data and stores the same in conjunction with information indicating that the new electronic data is a duplicate and information identifying the transfer destination server to which the original has been transferred.

16 Claims, 8 Drawing Sheets

ELECTRONIC DATA MANAGEMENT SYSTEM, ELECTRONIC DATA MANAGEMENT APPARATUS, AND ELECTRONIC DATA MANAGEMENT METHOD

BACKGROUND OF THE INVENTION

1. Field of the Invention

The present invention relates to an electronic data management system, an electronic data management apparatus, electronic data management methods, programs for causing a computer to execute the methods, and computer-readable storage media storing the programs.

2. Description of the Related Art

In recent years, awareness of the importance of safe management of electronic data including documents and images has been raised with increasing information security consciousness. In particular, to prevent important electronic data content from being illegally altered, there has been proposed a management system in which electronic data is attached with attribute information indicating that the data is the "original" (hereinafter referred to as the "original attribute") in order to manage the original data separately from other electronic data (see, for example, Japanese Laid-open Patent Publication No. 2000-285024). Electronic data sets, each attached with the original attribute, are managed under a management policy that prevents data from being edited in content and erased.

There is also known a technique in which feature information such as a hash value is extracted from electronic data managed as the original and compared with a predetermined characteristic amount. In accordance with a result of the comparison, it is guaranteed that the content of electronic data managed as the original has not illegally be altered and it is verified that the electronic data managed is the original.

Electronic data can be re-created by duplicating electronic data attached with the original attribute. In that case, the duplicate data is attached with attribute information indicating that the data is a "duplicate" (hereinafter referred to as the "duplicate attribute"), in order to manage the duplicate data by a management method different from that for the original data. In general, the duplicate is created for backup of the original, or for the purpose of eliminating the necessity for an unspecified user to directly access the original, and soon. Electronic data sets, each attached with the duplicate attribute, are managed under a management policy that permits the duplicate data to be erased but prohibits the creation of a further duplicate based on the duplicate data, which is different from the management policy for the original.

Furthermore, electronic data attached with the original attribute can be transferred via a network from a transfer source server to a transfer destination server. In that case, attribute information having been attached to the electronic data before data transfer can also be transferred together with the electronic data. Moreover, transfer history information indicating that the electronic data has been transferred can be added to attribute information of the electronic data after data transfer.

With this prior art, the attribute information indicating the transfer history can be managed only on the transfer destination side, although electronic data attached with the original attribute can be transferred from the transfer source side to the transfer destination side, posing a problem that the transfer destination of the original electronic data becomes unknown on the transfer source side. Since the electronic data is simply transferred from the transfer source side to the transfer destination side, nothing is left on the transfer source side. As a result, a user on the transfer source side who wishes to access the electronic data does not know the data transfer destination and even the fact that the electronic data has already been transferred from the transfer source side. This can cause confusion on the data transfer source side, in particular, in organizations where people and/or electronic data are frequently transferred, such as schools, companies in which numerous personal data are managed, and hospitals in which electronic medical charts are managed.

SUMMARY OF THE INVENTION

The present invention provides an electronic data management system, an electronic data management apparatus, and electronic data management methods which are capable of preventing confusion due to transfer of electronic data attached with an original attribute, and programs for causing a computer to execute the methods and computer-readable storage media storing the programs.

According to a first aspect of the present invention, there is provided an electronic data management system having first and second servers connected via a network to each other, wherein the first server includes a first storage unit adapted to store first electronic data attached with first attribute information indicating that the first electronic data is an original, an acceptance unit adapted to accept a transfer instruction for transferring the first electronic data stored in the first storage unit to the second server, a duplication unit adapted to create second electronic data by duplicating the first electronic data in response to the transfer instruction being accepted by the acceptance unit, an addition unit adapted to add, to the second electronic data created by the duplication unit, second attribute information indicating that the second electronic data is a duplicate, and a transmission unit adapted to transmit the first electronic data to the second server, and wherein the second server includes a reception unit adapted to receive the first electronic data transmitted from the first server, and a second storage unit adapted to store the first electronic data received by the reception unit in conjunction with the first attribute information.

According to a second aspect of the present invention, there is provided an electronic data management apparatus for connection via a network to other electronic data management apparatus, comprising a storage unit adapted to store first electronic data having first attribute information attached thereto indicating that the first electronic data is an original, an acceptance unit adapted to accept a transfer instruction to cause the first electronic data stored in the storage unit to be transferred to the other electronic data management apparatus, a duplication unit adapted to duplicate the first electronic data to thereby create second electronic data in response to the acceptance unit accepting the transfer instruction, an addition unit adapted to add, to the second electronic data created by the duplication unit, second attribute information indicating that the second electronic data is a duplicate, and a transmission unit adapted to transmit the first electronic data to the other electronic data management apparatus.

According to a third aspect of the present invention, there is provided an electronic data management method for an electronic data management system having first and second servers connected via a network to each other, comprising (a) the first server storing first electronic data attached with first attribute information indicating that the first electronic data is an original, (b) the first server accepting a transfer instruction for transferring the first electronic data stored in the step (a) to the second server, (c) the first server creating second electronic data by duplicating the first electronic data in response to the transfer instruction being accepted in the step (b), (d) the first server adding, to the second electronic data created in the step (c), second attribute information indicating that the second electronic data is a duplicate, (e) the first server transmitting the first electronic data to the second server, (f) the second server receiving the first electronic data transmitted from the first server, and (g) the second server storing the first electronic data received in the step (f) in conjunction with the first attribute information.

According to a fourth aspect of the present invention, there is provided an electronic data management method for an electronic data management apparatus connected via network to another electronic data management apparatus, comprising storing first electronic data having first attribute information attached indicating that the first electronic data is an original, accepting a transfer instruction to cause the first electronic data stored in the storage step to be transferred to the other electronic data management apparatus, duplicating the first electronic data to thereby create second electronic data in response to the transfer instruction being accepted by the acceptance step, adding, to the second electronic data created in the duplication step, second attribute information indicating that the second electronic data is a duplicate, and transmitting the first electronic data to the other electronic data management apparatus.

The present invention makes it possible to prevent occurrences of confusion due to electronic data transfer, even if electronic data attached with an original attribute is transferred.

Further features of the present invention will become apparent from the following description of exemplary embodiments with reference to the attached drawings.

DETAILED DESCRIPTION OF THE PREFERRED EMBODIMENT

The present invention will now be described in detail with reference to the drawings showing a preferred embodiment thereof.

Figure 1:
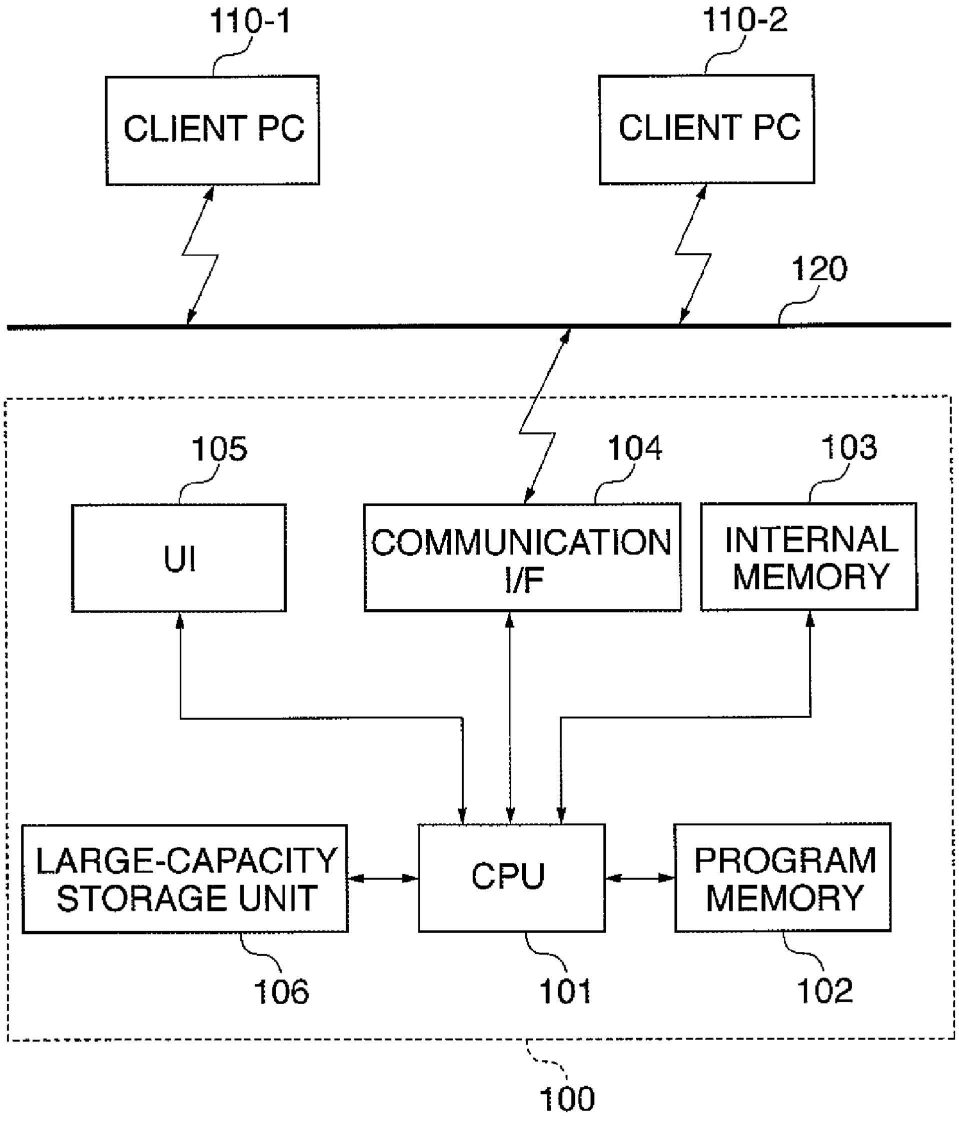
FIG. 1 is a block diagram showing an electronic data management system according to one embodiment of the present invention.

FIG. 1 is a view schematically showing the construction of an electronic data management system according to one embodiment of the present invention.

Referring to FIG. 1, an electronic data management system comprises an electronic data management server (hereinafter referred to as the server) 100 and a plurality of client PCs 110 (110-1, 110-2) which are connected to the server 100 via a network 120. In FIG. 1, the electronic data management server is shown to only include the server 100, but in actuality includes at least two servers on the network 120, such as a transfer source server and a transfer destination server between which electronic data is transferred. It is assumed that these servers have the same function as the server 100 described in detail below.

The server 100 includes a CPU 101 for overall control of the server, a program memory 102 storing a control program for the overall control of the server, and an internal memory 103 used for data processing.

The server 100 further includes a communication interface 104 that communicates via the network 120 with external devices (the client PCs 110 in FIG. 1), a user interface 105 adapted to be operated by a user, and a large-capacity storage unit 106 in which pieces of electronic data are stored.

The client PCs 110 are arranged to cause the server 100 to store electronic data and read out and peruse electronic data stored in the server 100.

Figure 2:
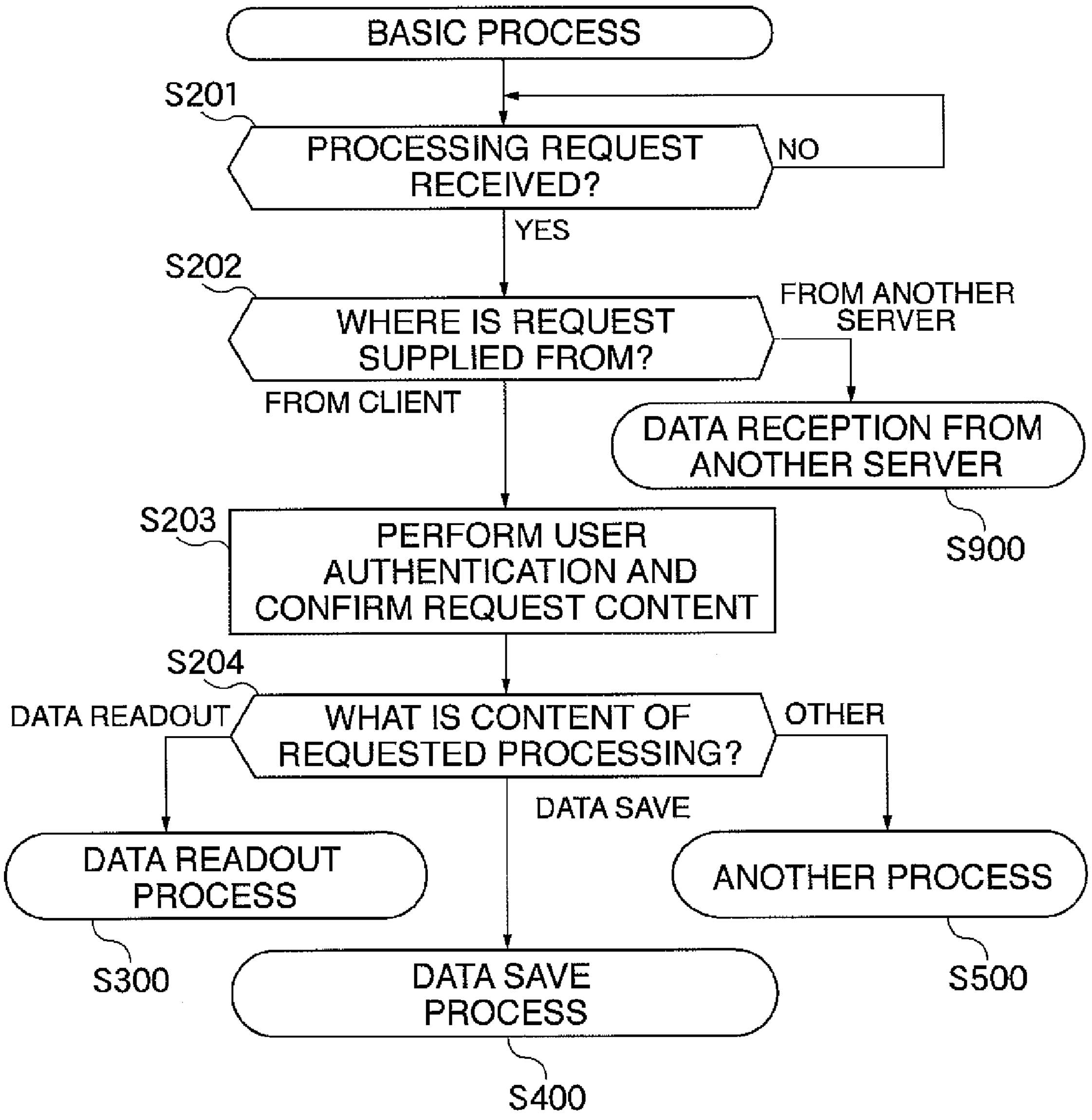
FIG. 2 is a flowchart showing the procedure of a basic process implemented by the server 100 shown in FIG. 1.

FIG. 2 is a flowchart showing the procedure of a basic process implemented by the server 100 shown in FIG. 1.

More specifically, the basic process is implemented by the CPU 101 of the server 100 shown in FIG. 1.

Referring to FIG. 2, after initialization is performed at the start of power supply, the server 100 starts to implement the basic process. First, the server 100 waits for receipt of a processing request from a device connected to the network 120 (step S201). If it is determined at the step S201 that a processing request has been accepted by the server 100, the process proceeds to a step S202 that determines the device from which the processing request has been supplied.

If it is determined at the step S202 that the processing request accepted in the step S201 has been supplied from a client PC 110 located in a domain to which the server 100 belongs, the process proceeds to a step S203 that performs user authentication and confirms the content of the request. For the user authentication, there may be adopted any of several known authentication techniques such as requesting the client PC 110 to send the desired one of user IDs, which have been set in advance on a user-by-user basis.

On the other hand, if it is determined at the step S202 that the processing request has been supplied from a server located outside the domain to which the server 100 belongs, the process proceeds to step S900 that implements a "process routine for data reception from another server", which will be described in detail later.

Next, the content of the requested processing is determined in step S204, and the process is branched to a process routine determined in accordance with the result of determination in the step S204.

If it is determined at the step S204 that a "data readout process" has been requested, the process proceeds to step S300. If a "data save process" has been requested, the process proceeds to step S400. If "another process" has been requested, the process proceeds to step S500.

The "other process" includes client PC registration/setting, user authentication registration/setting, security registration/setting, etc., and further includes data transmission to another server as will be described later.

The following are explanations on the aforementioned process routines.

Figure 3:
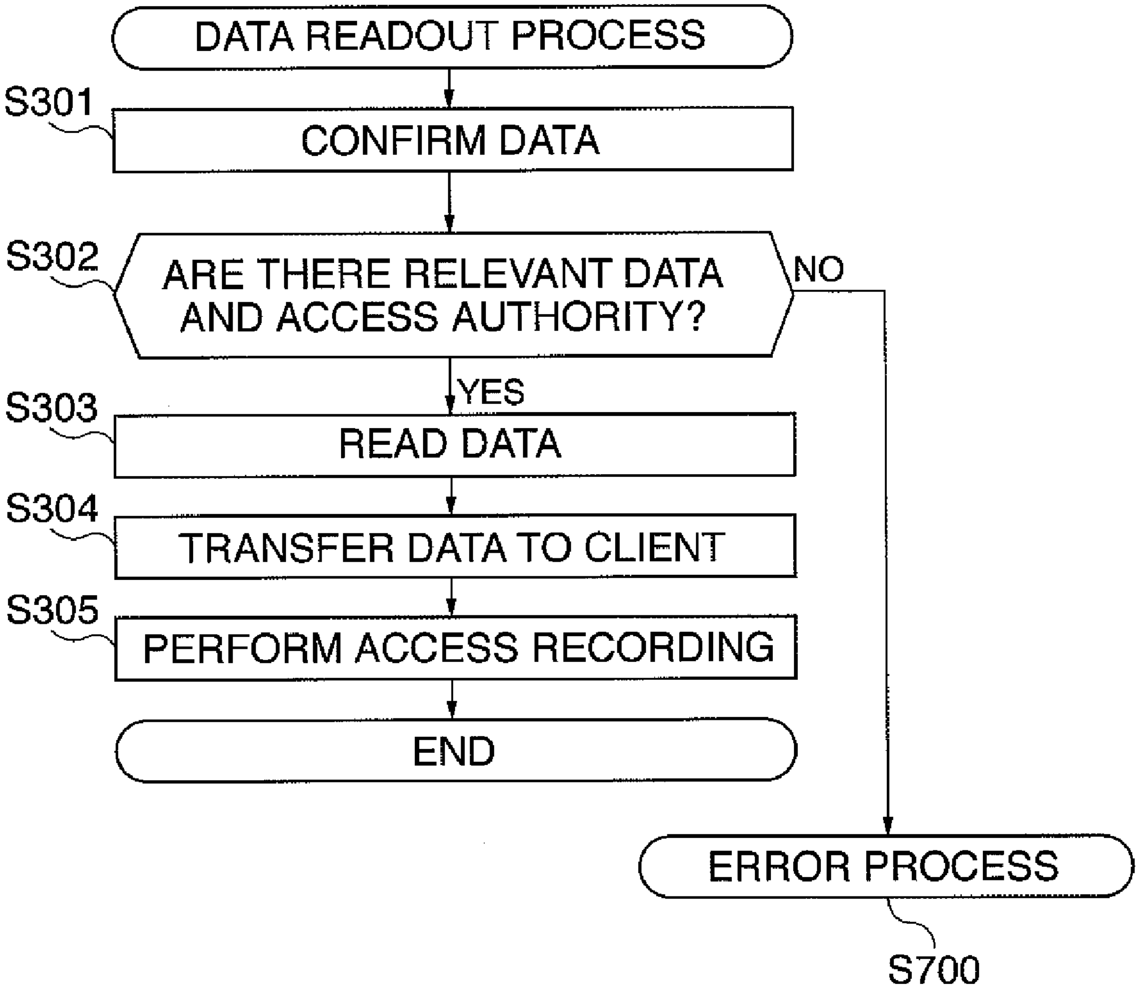
FIG. 3 is a flowchart showing a data readout process implemented in step S300 in FIG. 2.

FIG. 3 is a flowchart showing the procedure of the data readout process implemented in step S300 in FIG. 2. In the data readout process, electronic data stored in advance in the server 100 is outputted to a client PC from which a processing request has been issued, to thereby permit a user to peruse the electronic data using the client PC.

At step S301 in FIG. 3, in accordance with the content of the request confirmed in the step S203 in FIG. 2, indices in the large-capacity storage unit 106 of the server 100 are referred to. In a subsequent step S302, it is determined whether or not there is relevant data and whether or not the user having requested the processing has an access authority. If there is no relevant electronic data or if the user has no authority to peruse electronic data, the process proceeds to a step S700 in which an error process for notifying the user of the content of error is implemented.

It is determined at the step S302 that normal access is possible, the relevant electronic data is read out in step S303 from the large-capacity storage unit 106. Then, in step S304, the relevant electronic data is outputted via the network 120 to the client PC 110 from which the processing request has been issued.

Subsequently, an output data name, client name, user name, time, etc. are recorded in a step S305, whereupon the present process is completed. In the recording, the output data name, etc., may be recorded as a log in the server 100 or as attribute information for the relevant data.

Figure 4:
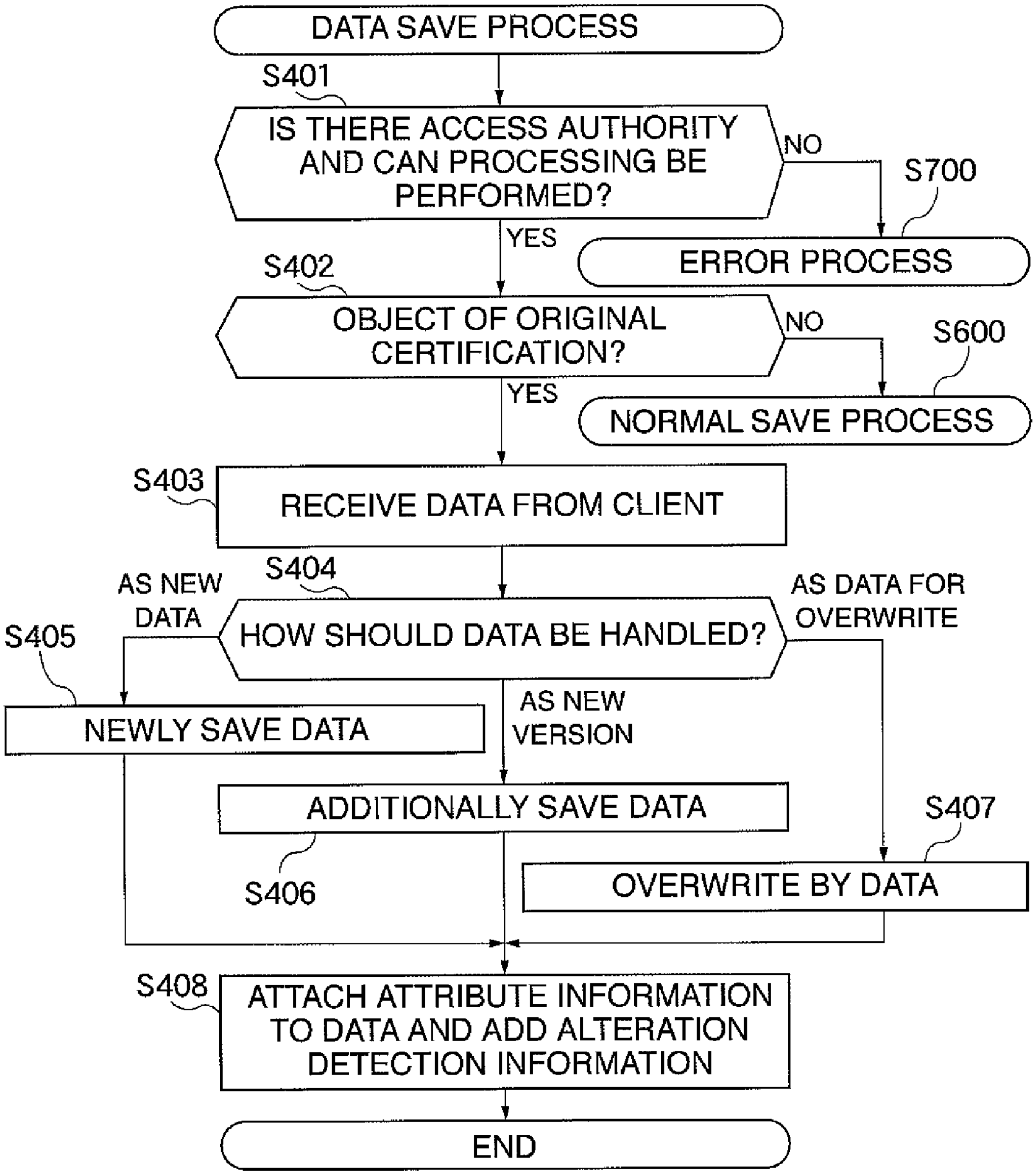
FIG. 4 is a flowchart showing a data save process implemented in step S400 in FIG. 2.

FIG. 4 is a flowchart showing the procedure of the data save process implemented in step S400 in FIG. 2.

Referring to FIG. 4, in step S401, in accordance with the content of the request confirmed in the step S203 in FIG. 2, whether the user having requested the processing has access authority or not is determined, and whether or not the requested processing can be implemented is determined. If the user having requested the processing has no access authority, or if the processing requested cannot be carried out by the server 100, the process proceeds to the step S700 that implements an error process for notifying the user of the details of the error.

If it is determined in the step S401 that normal processing can be carried out, the process proceeds to a step S402 that determines whether or not the electronic data to be saved in the server 100 should be handled as an object of original certification. The meaning of "handling electronic data as an object of original certification" is to attach the electronic data with attribute information indicating that the electronic data is the original, so that such electronic data may be managed separately from the other data. If it is determined in the step S402 that the electronic data is not required to be handled as an object of original certification, but should be saved as normal electronic data in the server 100, the process proceeds to a step S600 that implements a normal save process routine.

It is determined in the step S402 that the electronic data should be handled as an object of original certification, the process proceeds to a step S403 that receives the data from the client (the client PC 110). Next, how the data should be saved is determined in step S404. In this embodiment, data to be saved in the server 100 are classified into three types A, B and C as shown below.

Data of type A is data for which there is no relevant data in the server 100. A folder is newly prepared, into which the data of type A is saved in step S405.

Data of type B is data which is relevant to already-saved data in an existing folder and should be saved together with the already-saved data. The data of type B is saved in the existing folder in which the data of type B is grouped with the already-saved data. Alternatively, the already-saved data is retained as old version data in the existing folder, and the data of type B is obtained as updated version data by modifying the already-save data. The data of type B is saved in the existing folder together with the old version data in step S406.

Data of type C is data which is relevant to already-saved data in an existing folder and should be saved in place of the already-saved data. The data of type C is obtained as updated version data by modifying the already-save data, and the already-saved data is replaced by the data of type C in step S407. Thus, the old version data is erased, and only the new version electronic data is retained. It should noted that, in this case, alterations from the old version data to the new version data are saved as differences in attribute information.

In the case of electronic data of type A, a new folder is created, in which the data is saved in step S405. If electronic data is of type B, the data is saved in an existing folder in step S406 so as to be associated with relevant data in the folder. Alternatively, new version data obtained by updating old version data is saved together with the old version data and version management data. If electronic data is of type C, old version data is replaced by new version data in step S407.

In a step S408, attribute information is attached to the electronic data of whatever type. The attribute information includes information indicating that the electronic data is the original, information indicating the client PC having requested the save processing, and information indicating the user having instructed execution of the processing. Furthermore, feature information such as a hash value is extracted from each of the electronic data and the attribute information. The extracted feature information is added as alteration detection information to the electronic data. The alteration detection information is used for subsequent determination to determine whether or not the electronic data is the original. In the determination, the feature information is extracted from the electronic data, which is an object of the determination, and is compared with the feature information extracted and added in advance. If both the pieces of feature information agree with each other, it is guaranteed that the electronic data is the original (with no illegal alteration).

Figure 5:
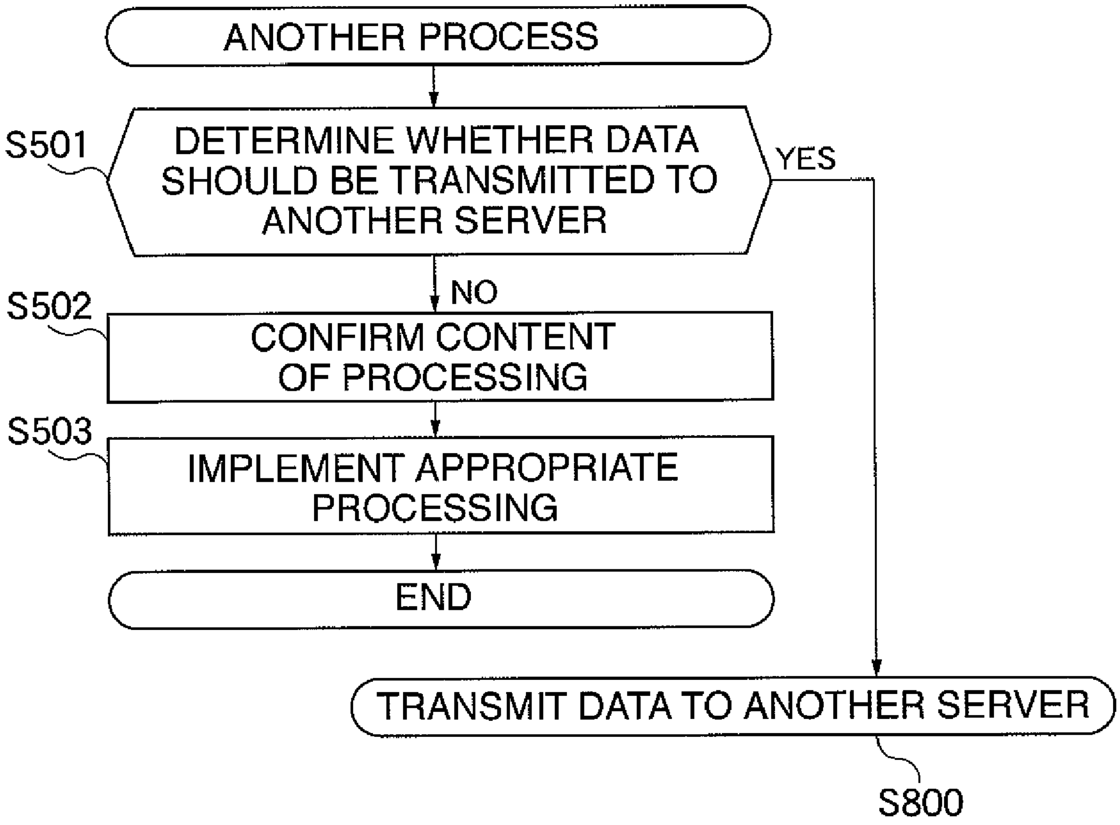
FIG. 5 is a flowchart showing the procedure of another process implemented in step S500 in FIG. 2.

FIG. 5 is a flowchart showing the procedure of another process implemented in the step S500 in FIG. 2.

Based on the content of a request confirmed in the step S203 in FIG. 2, a step S501 in FIG. 5 determines whether or not electronic data should be transmitted to another server, i.e., whether or not an instruction to transfer electronic data attached with the original attribute to another server has been accepted (acceptance unit). If it is determined that the data should be transmitted to the other server, the process proceeds to a step S800 that optimally implements a process for data transmission to the other server.

If it is determined at the step S501 that the data transmission to the other server is unnecessary, the content of processing is confirmed in a step S502, and appropriate processing is implemented in a step S503. For example, client PC registration/setting, user authentication registration/setting, security registration/setting, etc. are carried out, as adjustments between the server 100 and the client. In this step, registration of the other party and setting of conditions are performed prior to execution of transmission/reception between the server 100 and another server.

Figure 6:
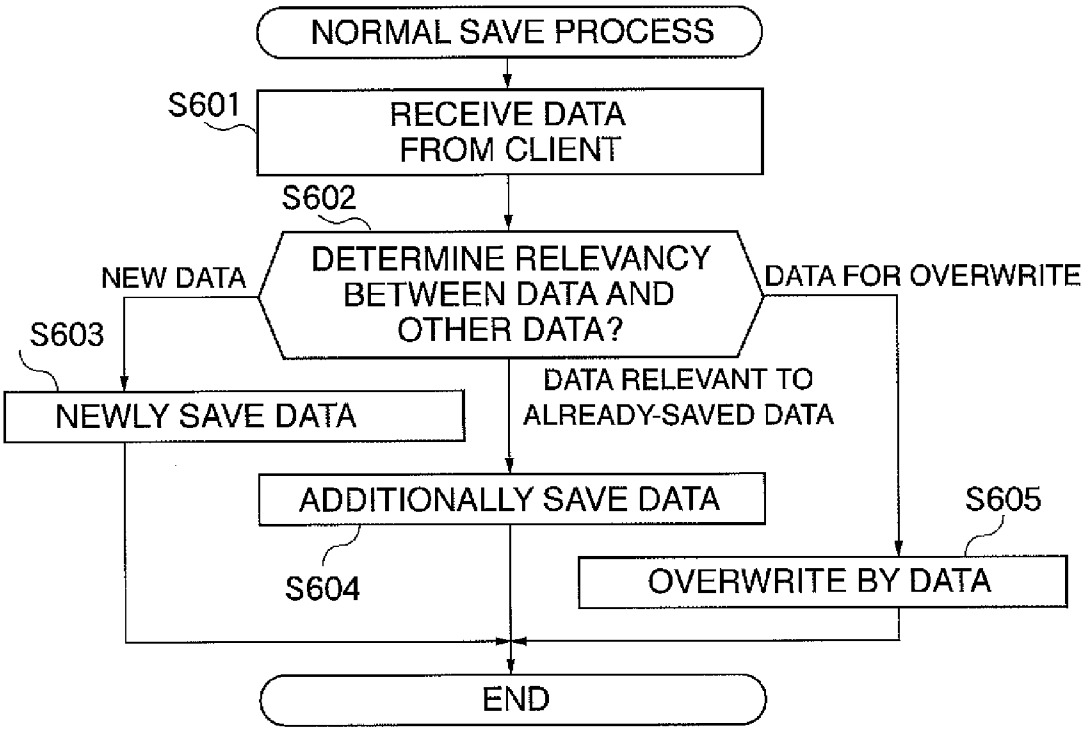
FIG. 6 is a flowchart showing a normal save process implemented in step S600 in FIG. 4.

FIG. 6 is a flowchart showing the procedure of a normal save process implemented in the step S600 in FIG. 4.

In step S601 in FIG. 6, the server 100 receives user data transmitted from the client PC 110 and saves the received data in a folder specified by the user. Next, the relevancy between the received data and other data is determined by CPU 101 (step S602).

If it is determined in step S602 that the received data is new data, a new folder is created and the received data is saved into the new folder (step S603). If it is determined that the received data is relevant to data saved in an existing folder, the received data is saved in the existing folder (step S604). If it is determined that data should be rewritten, old version data is overwritten by the received data for updating (step S605), whereupon the present process is completed.

Figure 7:
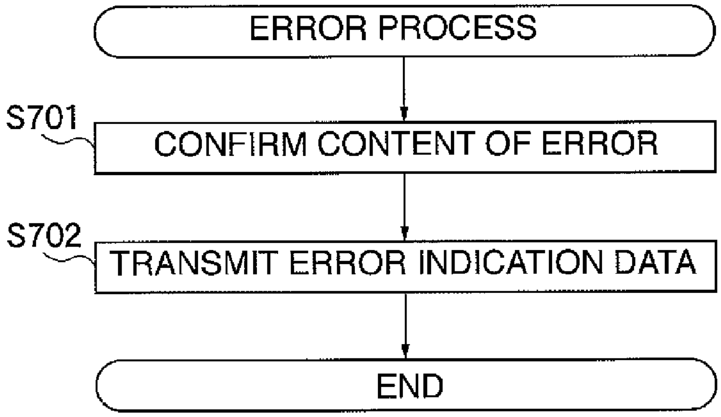
FIG. 7 is a flowchart showing an error process implemented in step S700 in FIG. 3.

FIG. 7 is a flowchart showing the procedure of an error process implemented in the step S700 in FIG. 3.

Referring to FIG. 7, in step S701, the content of error determined in the step S301 in FIG. 3 or in the step S401 in FIG. 4 is confirmed. In a step S702, data for appropriate error indication is transmitted to the client PC 110. Depending on the content of error, the desired operation is carried out in accordance with user instructions, whereupon the present process is completed.

It should be noted that, although not shown in the drawings, the process proceeds to the step S700 to implement the error process, if a result cannot be obtained in any determination loop or if time is up in any waiting loop in the flowcharts.

Next, an explanation will be given of a process in which the server 100 transfers data attached with the original attribute to another server. It should be noted that for convenience of explanation, a server that stores electronic data before data transfer will be referred to as "server A (the transfer source side)", whereas a server that stores electronic data after data transfer will be referred to as "server B (the transfer destination side)".

Figure 8:
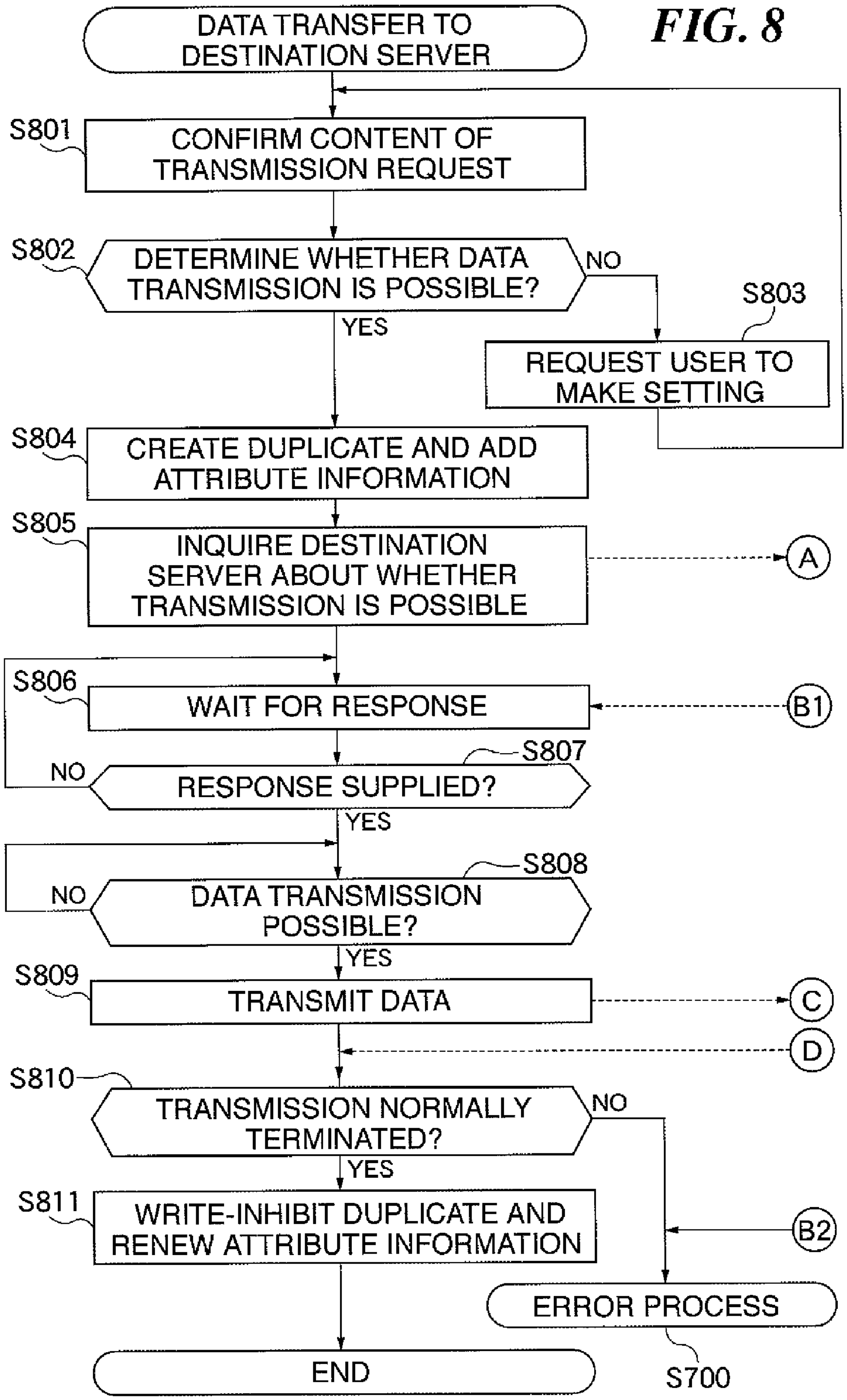
FIG. 8 is a flowchart showing a process for data transfer to another server implemented in step S800 in FIG. 5.

FIG. 8 is a flowchart showing the procedure of a process for data transfer to another server in the step S800 in FIG. 5.

More specifically, FIG. 8 shows a process implemented by the source side server A to transfer electronic data to the destination side server B.

When there is a request for data transmission to another server, a step S801 in FIG. 8 confirms the content of the data transmission request. Specifically, the step S801 first identifies the server B on the transfer destination side, and confirms conditions for connection with the server A on the transfer source side. Next, the step S801 confirms whether or not the user having issued the request has all of the following authorities: an authority to access the server A for transmitting data in the server A to the outside; an authority to transfer the data to be transferred; and an authority to access the server B on the transfer destination side. Setting conditions for connection with the server B are also confirmed.

Based on the above-described confirmed points, next step S802 determines whether or not data transmission can be carried out (determination unit in server A). If there is an unclear point or defect, in step S803 server A requests the user to make resetting, whereupon the process returns to the step S801.

It should be noted that although illustrations are omitted, the process returns to the step S700 that implements the error process, if conditions cannot be set in the loop from the step S801 to the step S803. Also, the process proceeds to the step S700, if the subsequent processing cannot be executed in accordance with the procedure explained here or if time is up in any waiting loop in the subsequent processing.

If it is determined in step S802 that data transfer can be made, the process proceeds to step S804 in which a duplicate of the electronic data attached with the original attribute is created, thereby creating new electronic data (duplication unit in server A). Attribute information is added to the newly created electronic data (addition unit in server A). The attribute information includes information indicating that the new electronic data is a duplicate, date of data creation, information indicating that the corresponding original has been transferred, information identifying a destination to which the original has been transferred (server B), and information indicating a user having requested the transfer process. The reason why the attribute information of "duplicate" is added to the duplicate data is that there must be one and only one electronic data that has the "original" attribute and that the duplicate data must be managed as the "duplicate" to prevent the presence of a plurality of originals.

Figure 9:
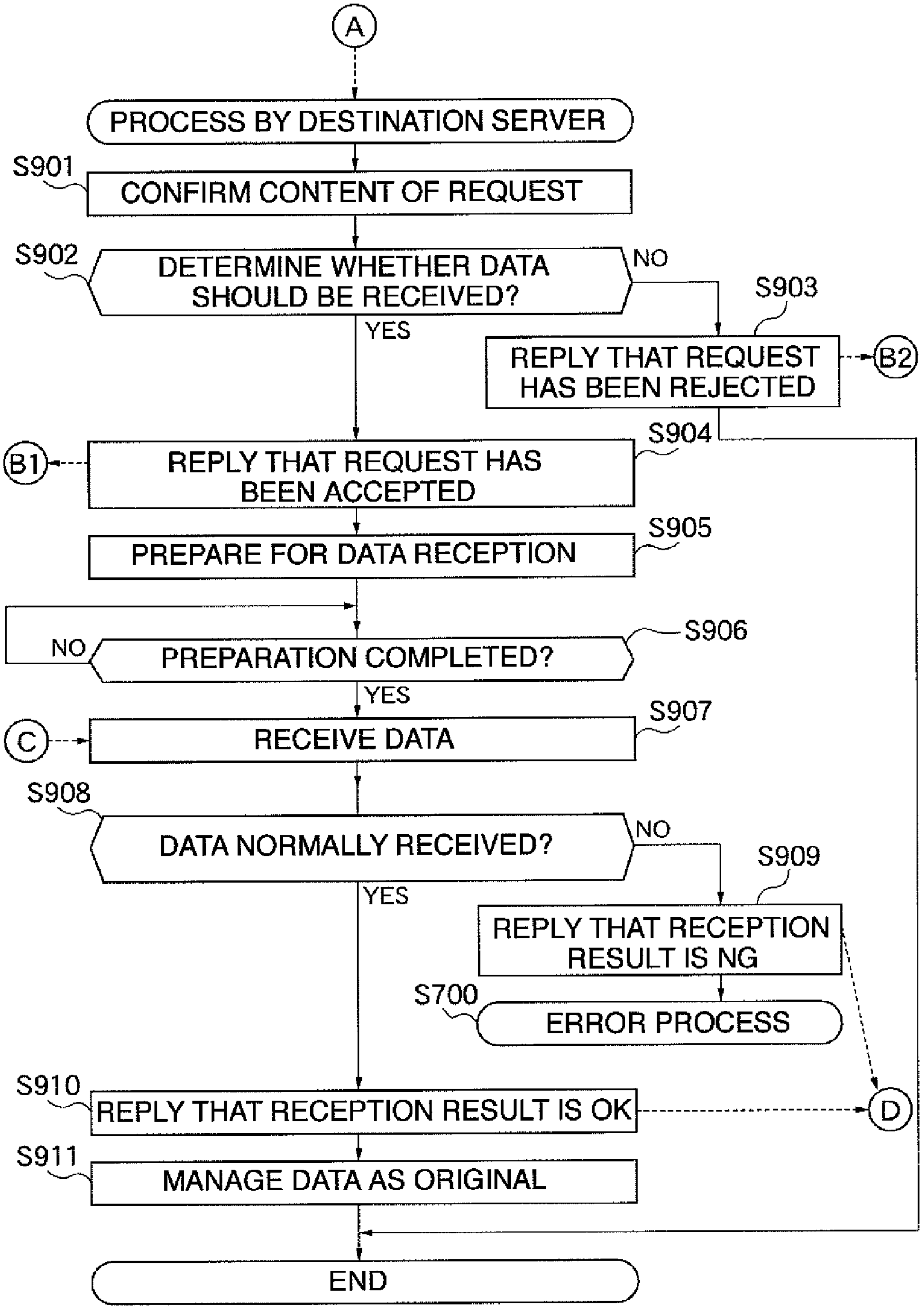
FIG. 9 is a flowchart showing a process implemented by another server in step S900 in FIG. 2.

If the preparation for data transmission is completed, in step S805 server A asks server B on the transmission destination side about whether data transmission via the network 120 is possible. Flowchart connectors A, B1, B2, C, and D shown in FIGS. 8 and 9 are for coupling process shown in FIG. 8 with process in FIG. 9. The process proceeds in the direction indicated by arrows on dotted lines in FIGS. 8 and 9.

Steps S806 and S807 form a loop, in which server A waits for a response from the transmission destination server B. If a response is supplied from the transmission destination server B via the flowchart connector B1, the step S806 responds to the response, and the process proceeds via the step S807 to a step S808 that determines whether or not data transmission is possible.

If the step S808 determines that data transmission to the transmission destination server B is not possible, the process waits until data transmission becomes possible. If server A in step S808 determines that data transmission to the server B is possible, data transmission to the server B is started in step S809 (data transmission unit in server A).

In step S809, server A first carries out negotiation with the transmission destination server B, and starts data transmission after safety, assuredness, and stability are ensured. The data is transmitted via the connector C to the transmission destination server B. From a physical viewpoint, the data is transmitted via the network 120.

Based on a termination signal notified to server A from the transmission destination server B via the connector D, step S810 determines whether or not the data transmission is normally terminated. If it is determined there is an abnormality, the process proceeds to the step S700 that implements the error process. On the other hand, if the step S810 determines that the data transmission is terminated normally, the duplicate retained in the transmission source server A is write/edit inhibited, an indication that the transfer of the original has been completed is added to the attribute information, and the attribute information is saved, in a step S811 (edition unit and control unit in server A). Then, the present process is completed.

It should be noted that the connector B2 is for receiving a rejection signal, which is supplied from the transmission destination server B that refuses data reception when the step S805 supplies a data transmission request to the server B via the connector A. If the rejection signal is received via the connector B2, the process proceeds to the step S700 that implements the error process, and data transmission to the server B is completed.

FIG. 9 is a flowchart showing the procedure of a process implemented by another server in the step S900 in FIG. 2.

More specifically, FIG. 9 explains the process routine implemented by the destination side server B that receives data transmitted from the server A. From the viewpoint of independent operation of the server B, the process in FIG. 9 corresponding to the step S900 in FIG. 2 is a process routine branched from the basic process in FIG. 2. On the other hand, from the viewpoint of cooperative operation of the servers A and B, the process in FIG. 9 accepts a data request from the source server A via the connector A in FIGS. 8 and 9.

Referring to FIG. 9, in step S901 server B confirms the content of the request from the server A (confirmation unit in server B). Next, step S902 determines whether or not data should be received (determination unit in server B). If it is determined that the data should not be received, the process proceeds to step S903 that sets a data reception rejection (i.e., NG (no good)) and notifies the data reception rejection to the server A via the connector B2. In the case of data reception being rejected, the processing to be implemented by the server B is completed.

If it is determined in the step S902 that the data from the server A should be received, the process proceeds to step S904 that sends back a reply to indicate that the request for data reception has been accepted to the server A via the connector B1. Next, in step S905 server B prepares for data reception from server A. Specifically, a folder for data save is created, and so on.

Next, it is determined in step S906 whether or not the preparation for data reception has been completed. If not, the steps S905 and S906 form a waiting loop until the preparation for data reception has been completed. If it is determined that the preparation for data reception is completed, the process proceeds to step S907 in which server B receives data from server A via connector C (data reception unit in server B). From a physical viewpoint, the data is received from the server A via the network 120.

Next, in step S908 it is determined whether or not the data has been normally received, and the result of this determination is notified to server A via the connector D. If it is determined in the step S908 that the data has not been normally received, the process proceeds to a step S909 that notifies the server A that the reception result is NG (no good). Then, the process proceeds to step S700 in which server B implements the error process to notify the user of the reception result.

If it is determined in step S908 that the data has been normally received, the process proceeds to step S910 in which server A is notified that the reception result is OK. Then, the process proceeds to step S911 in which settings for managing the data sent from the server A as the original (original management unit in server B) are recorded in the attribute information, whereupon the present process is terminated.

The electronic data management system of this embodiment is intended for use in managing the originals, such as hospital medical charts, on the transfer source side before data transfer and on the transfer destination side after data transfer. The following is an explanation of a method for tracking the location of the original using the electronic data storage system of this embodiment.

First, the server A processes a request from a client in the step S502 in FIG. 5. If data to be confirmed is present in the large-capacity storage unit 106 of the server A, the data can be retrieved.

If the original has been transferred to the server B, a duplicate is stored in a write-inhibited state in the large-capacity storage unit 106, as described above. Therefore, the transfer destination server B can be identified based on attribute information attached to the duplicate that can be read out from the storage unit. Furthermore, the original after data transfer and the history of attribute information after data transfer can be searched by asking server B about it.

If the original is retrieved from server B, it is possible to read out the attribute information (original attribute) attached to the original (electronic data) to identify the transfer source server A. Furthermore, the original before data transfer and the history of attribute information before data transfer can be searched by asking server A about it.

It should be noted that search for the original is permitted only when there is an authority to access the original and the server on which it is stored.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium.

In that case, the program code itself read from the storage medium realizes the functions of the above described embodiment, and therefore the program code and the storage medium in which the program code is stored may constitute the present invention.

Examples of the storage medium for supplying the program code include a floppy (registered trademark) disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications and equivalent structures and functions.

This application claims the benefit of Japanese Patent Application No. 2006-253206, filed Sep. 19, 2006, which is hereby incorporated by reference herein in its entirety.

What is claimed is:

1. An electronic data management system having first and second servers connected via a network to each other, wherein said first server includes:

a first storage unit adapted to store first electronic data attached with first attribute information indicating that the first electronic data is an original, an acceptance unit adapted to accept a transfer instruction for transferring the first electronic data stored in said first storage unit to the second server, a duplication unit adapted to create second electronic data by duplicating the first electronic data in response to the transfer instruction being accepted by said acceptance unit, the created second electronic data being stored in said first storage unit, an addition unit adapted to add, to the second electronic data created by said duplication unit, second attribute information indicating that the second electronic data is a duplicate, and a transmission unit adapted to transmit the first electronic data to the second server, wherein the second electronic data, to which the second attribute information is added, remains in said first storage unit after the first electronic data is transmitted; and wherein said second server includes:

a reception unit adapted to receive the first electronic data transmitted from said first server, and a second storage unit adapted to store the first electronic data received by said reception unit in conjunction with the first attribute information.

2. The electronic data management system according to claim 1, wherein said second storage unit is adapted to store first transfer history information in conjunction with the first electronic data having first attribute information attached thereto, the first transfer history information indicating that the first electronic data has been transferred from the first server.

3. The electronic data management system according to claim 1, wherein said second storage unit is adapted to store duplicate creation history information in conjunction with the first electronic data having the first attribute information attached thereto, the duplicate creation history information indicating that the second electronic data, which is a duplicate corresponding to the first electronic data, has been created.

4. The electronic data management system according to claim 1, wherein said first storage unit is adapted to store second transfer history information in conjunction with the second electronic data having second attribute information attached thereto, the second transfer history information indicating that the first electronic data, which is the original corresponding to the second electronic data, has been transferred to the second server.

5. The electronic data management system according to claim 1, wherein said acceptance unit is adapted to receive and accept, via the network, a transfer instruction inputted to an information processing apparatus connected to said acceptance unit via the network.

6. The electronic data management system according to claim 1, further including:

an output unit adapted to output, in a case where the information processing apparatus issues a request for perusal of electronic data stored in said first storage unit or said second storage unit, the requested electronic data to the information processing apparatus.

7. The electronic data management system according to claim 1, further including:

an edit unit adapted to edit electronic data stored in said first storage unit or said second storage unit; and a control unit adapted to control said edit unit to prohibit it from editing electronic data attached with the second attribute information.

8. An electronic data management apparatus for connection via a network to other electronic data management apparatus, comprising:

a storage unit adapted to store first electronic data having first attribute information attached thereto indicating that the first electronic data is an original;

an acceptance unit adapted to accept a transfer instruction to cause the first electronic data stored in said storage unit to be transferred to the other electronic data management apparatus;

a duplication unit adapted to duplicate the first electronic data to thereby create second electronic data in response to said acceptance unit accepting the transfer instruction;

an addition unit adapted to add, to the second electronic data created by said duplication unit, second attribute information indicating that the second electronic data is a duplicate, the created second electronic data being stored in said storage unit; and a transmission unit adapted to transmit the first electronic data to the other electronic data management apparatus, wherein the second electronic data, to which the second attribute information is added, remains in said storage unit after the first electronic data is transmitted.

9. The electronic data management apparatus according to claim 8, wherein said storage unit is adapted to store transfer history information in conjunction with the second electronic data having the second attribute information attached thereto, the transfer history information indicating that the first electronic data, which is an original corresponding to the second electronic data, has been transferred to the other electronic data management apparatus.

10. The electronic data management apparatus according to claim 8, wherein said acceptance unit is adapted to receive and accept via the network a transfer instruction inputted to an information processing apparatus connected to said network.

11. The electronic data management apparatus according to claim 8, further including:

an output unit adapted to output, if a request to peruse electronic data stored in said storage unit is received, the requested electronic data to an information processing apparatus making the request.

12. The electronic data management apparatus according to claim 8, further including:

an edit unit adapted to edit electronic data stored in said storage unit; and a control unit adapted to control said edit unit to inhibit it from editing electronic data attached with the second attribute information.

13. An electronic data management method, comprising the steps of:

(a) storing, by a first server, first electronic data attached with first attribute information indicating that the first electronic data is an original;

(b) accepting, by the first server, a transfer instruction for transferring the first electronic data stored in said step (a) to a second server connected to the first server via a network;

(c) creating, by the first server, second electronic data by duplicating the first electronic data in response to the transfer instruction being accepted in said step (b);

(d) adding, by the first server, to the second electronic data created in said step (c), second attribute information indicating that the second electronic data is a duplicate;

(e) transmitting, by the first server, the first electronic data to the second server;

(f) storing, by the first server, the second electronic data, to which the second attribute information is added, after the first electronic data is transmitted;

(g) receiving, by the second server, the first electronic data transmitted from the first server; and (h) storing, by the second server, the first electronic data received in said step (g) in conjunction with the first attribute information.

14. An electronic data management method, comprising the steps of:

storing, by an electronic data management apparatus, first electronic data having first attribute information attached indicating that the first electronic data is an original;

accepting, by the electronic data management apparatus, a transfer instruction to cause the first electronic data stored in said storage step to be transferred to another electronic data management apparatus connected to the electronic data management apparatus via a network;

duplicating, by the electronic data management apparatus, the first electronic data to thereby create second electronic data in response to the transfer instruction being accepted by said acceptance step;

storing the created second electronic data in the electronic data management apparatus;

adding, by the electronic data management apparatus, to the second electronic data created in said duplication step, second attribute information indicating that the second electronic data is a duplicate; and transmitting, by the electronic data management apparatus, the first electronic data to the other electronic data management apparatus, wherein the second electronic data, to which the second attribute information is added, remains in the electronic data management apparatus after the first electronic data is transmitted.

15. A computer-readable storage medium storing an electronic data management program that when executed by a computer, causes the computer to execute an electronic data management method comprising the steps of:

(a) storing, by a first server, first electronic data attached with first attribute information indicating that the first electronic data is an original;

(b) accepting, by the first server, a transfer instruction for transferring the first electronic data stored in said step (a) to a second server connected to the first server via a network;

(c) creating, by the first server, second electronic data by duplicating the first electronic data in response to the transfer instruction being accepted in said step (b);

(d) adding, by the first server, to the second electronic data created in said step (c), second attribute information indicating that the second electronic data is a duplicate;

(e) transmitting, by the first server, the first electronic data to the second server;

(f) storing, by the first server, the second electronic data, to which the second attribute information is added, after the first electronic data is transmitted;

(g) receiving, by the second server, the first electronic data transmitted from the first server; and (h) storing, by the second server, the first electronic data received in said step (g) in conjunction with the first attribute information.

16. A computer-readable storage medium storing an electronic data management program that when executed by a computer, causes the computer to execute an electronic data management method comprising the steps of:

storing, by an electronic data management apparatus, first electronic data having first attribute information attached indicating that the first electronic data is an original;

accepting, by the electronic data management apparatus, a transfer instruction to cause the first electronic data stored in said storage step to be transferred to another electronic data management apparatus connected to the electronic data management apparatus via a network;

duplicating, by the electronic data management apparatus, the first electronic data to thereby create second electronic data in response to the transfer instruction being accepted by said acceptance step;

storing the created second electronic data in the electronic data management apparatus;

adding, by the electronic data management apparatus, to the second electronic data created in said duplication step, second attribute information indicating that the second electronic data is a duplicate; and transmitting, by the electronic data management apparatus, the first electronic data to the other electronic data management apparatus, wherein the second electronic data, to which the second attribute information is added, remains in the electronic data management apparatus after the first electronic data is transmitted.

* * * * *